United States Patent [19]
Huson

[11] Patent Number: 5,085,149
[45] Date of Patent: Feb. 4, 1992

[54] GROUND VEHICLE SUSPENSION AND GUIDANCE AND ELECTROMAGNETIC SYSTEM THEREOF WITH MULTIPLE SURFACE ARCUATE REACTION RAILS

[75] Inventor: Frederick R. Huson, The Woodlands, Tex.

[73] Assignee: Houston Area Research Center, The Woodlands, Tex.

[21] Appl. No.: 505,922

[22] Filed: Apr. 6, 1990

[51] Int. Cl.$^5$ ............................................. B60L 13/04
[52] U.S. Cl. .................................... 104/281; 104/285; 104/286
[58] Field of Search ................ 104/281, 282, 285, 286

[56] References Cited

U.S. PATENT DOCUMENTS

| | | | |
|---|---|---|---|
| 3,470,828 | 10/1969 | Powell, Jr. et al. | 104/148 |
| 3,768,417 | 10/1973 | Thorton et al. | 104/285 X |
| 3,780,667 | 12/1973 | Miericke et al. | 104/285 |
| 3,842,750 | 10/1974 | Miericke | 104/286 X |
| 3,850,109 | 11/1974 | Thornton | 104/286 X |
| 3,903,809 | 9/1976 | Miericke et al. | 104/286 X |
| 3,904,899 | 9/1975 | Malfert | 104/290 |
| 4,549,156 | 10/1985 | Mine et al. | 104/285 X |
| 4,783,628 | 11/1988 | Huson | 324/320 |
| 4,822,772 | 4/1989 | Huson | 505/1 |

FOREIGN PATENT DOCUMENTS 2053093  4/1971  France .

OTHER PUBLICATIONS

The Canadian Institute of Guided Ground Transport et al., "MAGLEV Technology Assessment", CIGGT Report 86-11 (1985).
Danby et al., "Design Approach and Parameters for Magnetically Levitated Transport Systems", published in *Superconductivity and Its Application* (Elsevier Science Publishing Co., Inc. (1988).

Primary Examiner—Robert J. Oberleitner
Assistant Examiner—S. Joseph Morano
Attorney, Agent, or Firm—Vinson & Elkins

[57] ABSTRACT

The improved support and guidance system includes a super conductor mounted in a vehicle and positioned to be above and on both sides of the upper end of a rail. The super conductor is provided with a housing and an iron core or shield is positioned within the housing to shield and shunt the return flux of the magnet so that the fringe field does not extend into the vehicle. In the preferred form of the invention, the rail in transverse section has an upper central flat surface with two concave surfaces extending to either side. The super conductors are positioned above and generally parallel to the concave surfaces of the rail. The iron shield has a horizontal central portion above the flat top of the rail and side bulbous portions on either side immediately above and to the side of the super conductors. The invention has application to the magnetic support and guidance system, the vehicle with the guidance system thereon and the combination of such vehicle with the rails.

14 Claims, 2 Drawing Sheets

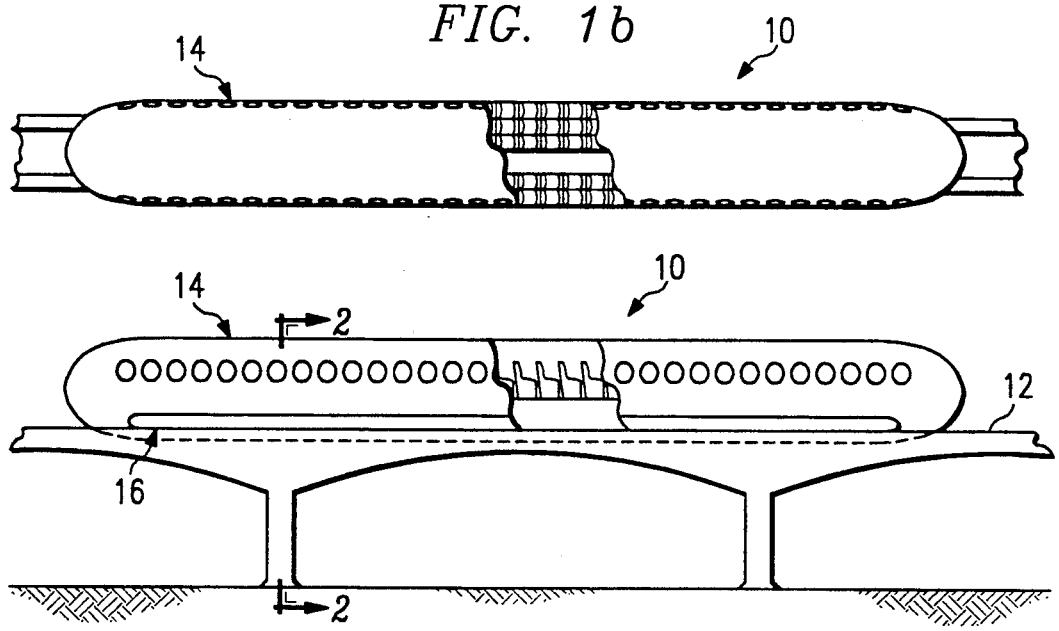
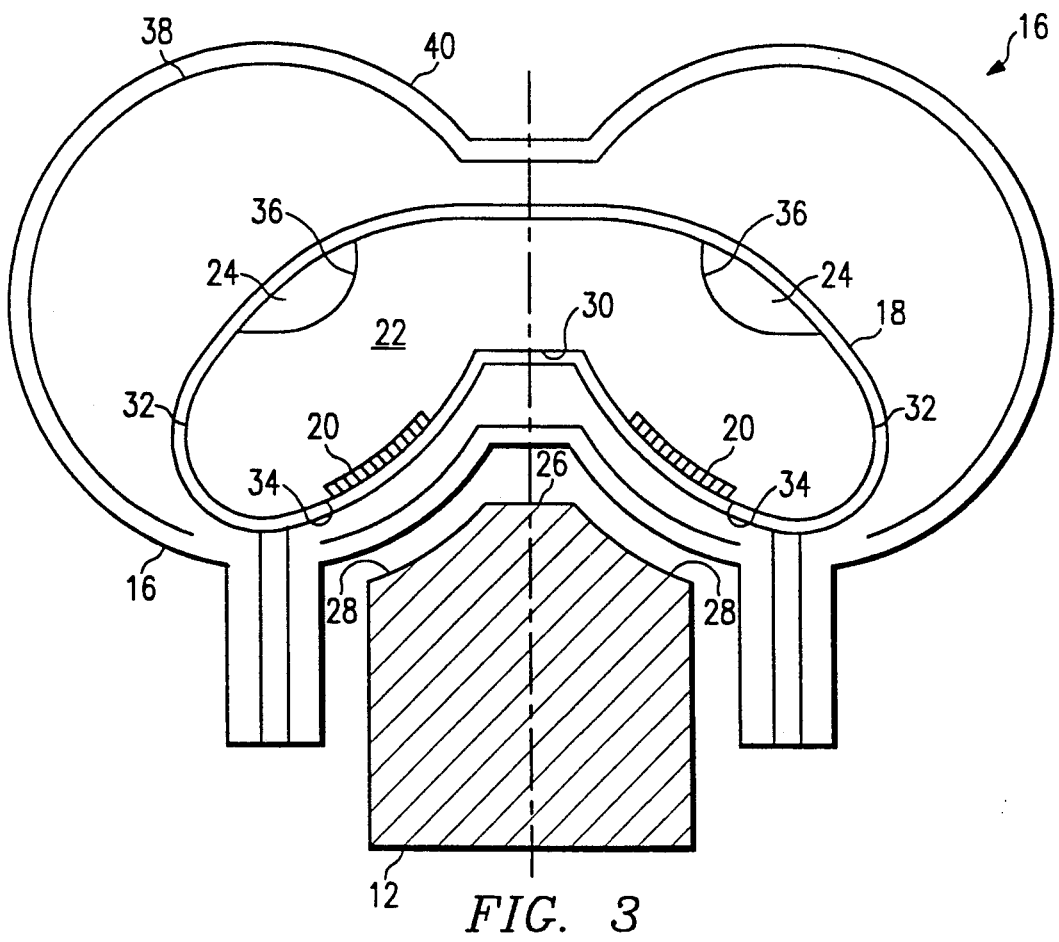

GROUND VEHICLE SUSPENSION AND GUIDANCE AND ELECTROMAGNETIC SYSTEM THEREOF WITH MULTIPLE SURFACE ARCUATE REACTION RAILS

BACKGROUND

The present invention relates to an improved electromagnetic suspension and guidance system for ground vehicles, such as a train.

Prior to the present invention there have been two type of electromagnetic suspension systems. These type of systems may be classified as utilizing repulsive levitation and attractive levitation.

In the repulsive type of levitation a superconducting magnet is carried by the vehicle over a metal plate and induces a current to levitate the vehicle. This type of system has two specific disadvantages. It requires the support of wheels at speeds which are below the speed required to establish the vehicle levitation and the use of the superconducting magnets creates substantial fringe fields in the portions of the vehicle normally occupied by passengers and operators. An example of this type of system can be seen in the U.S. Pat. No. 3,470,828 to J. R. Powell, Jr. et al.

In the attractive type of system levitation is provided by positioning a magnet supported by the vehicle below a portion of a rail, such as the flanges of a T-shaped rail, and allowing the attraction force of the magnet to provide the force of levitation. This system has the disadvantages that it does not use superconducting magnets but uses conventional copper electromagnets and thus is not as efficient as desired and further that the tolerances of construction of the rail and the vehicle have to be very high. Additionally, this systems requires that the forces created for levitation must be adjusted very rapidly for proper operation. In both of these prior art systems, an additional system is added for stabilizing the position of the vehicle with respect to the rails.

Superconducting electromagnets have been known and use in the prior art. Additionally, in the use of such devices in medical apparatus, it has been found that the limiting of the fringe field was desirable and such shielding is taught in the F. R. Huson U.S. Pat. Nos. 4,783,628 and 4,822,772.

SUMMARY

The present invention relates to an improved vehicles suspension and guidance system which utilizes superconducting electromagnetic repulsion for levitation. The superconducting magnet is carried by the vehicle, such as a train, under the body of the car and is provided across the top and partially on the side of either side of the rail, there being two rails and magnets for each rail in the preferred form of the invention. The superconducting magnet is contained within a housing through which helium, at a temperature to ensure superconductivity, is circulated. An iron core structure is contained within the housing with the superconducting magnet and the passages for the helium. This iron structure has a generally arcuate shape above the rail with enlarged inner and outer sides and functions to eliminate the fringe field above the iron structure and to enhance the magnetic field below the iron structure. This housing is supported within a hollow structure in which a vacuum is maintained.

An object of the present invention is to provide an improved electromagnetic suspension and guidance system for a ground vehicle, such as a train, which can utilize a superconducting magnet with the advantages of the no fringe field and combines guidance and levitation all in the same system.

Another object of the present invention is to provide an improved electromagnetic suspension and guidance system for a ground vehicle in which the fringe field is substantially totally shielded from the interior of the vehicle.

A further object of the present invention is to provide an improved electromagnetic suspension and guidance system for a ground vehicle which can utilize a superconducting electromagnet.

Still another object of the present invention is to provide an improved electromagnetic vehicle suspension system which is efficient in its use of power and does not require close tolerances between the rail and the electromagnetic structure.

BRIEF DESCRIPTION OF THE DRAWINGS

These and other objects and advantages of the present invention are hereinafter set forth in the drawings wherein:

FIGS. 1a and 1b are elevational and plan views, respectively, of a rail vehicle utilizing the improved system of the present invention.

FIG. 3 is an enlarged detail sectional view of the structure of the top portion of one rail and the electromagnet and its housing and other associated structure.

DESCRIPTION OF THE PREFERRED EMBODIMENT

Figure 2:
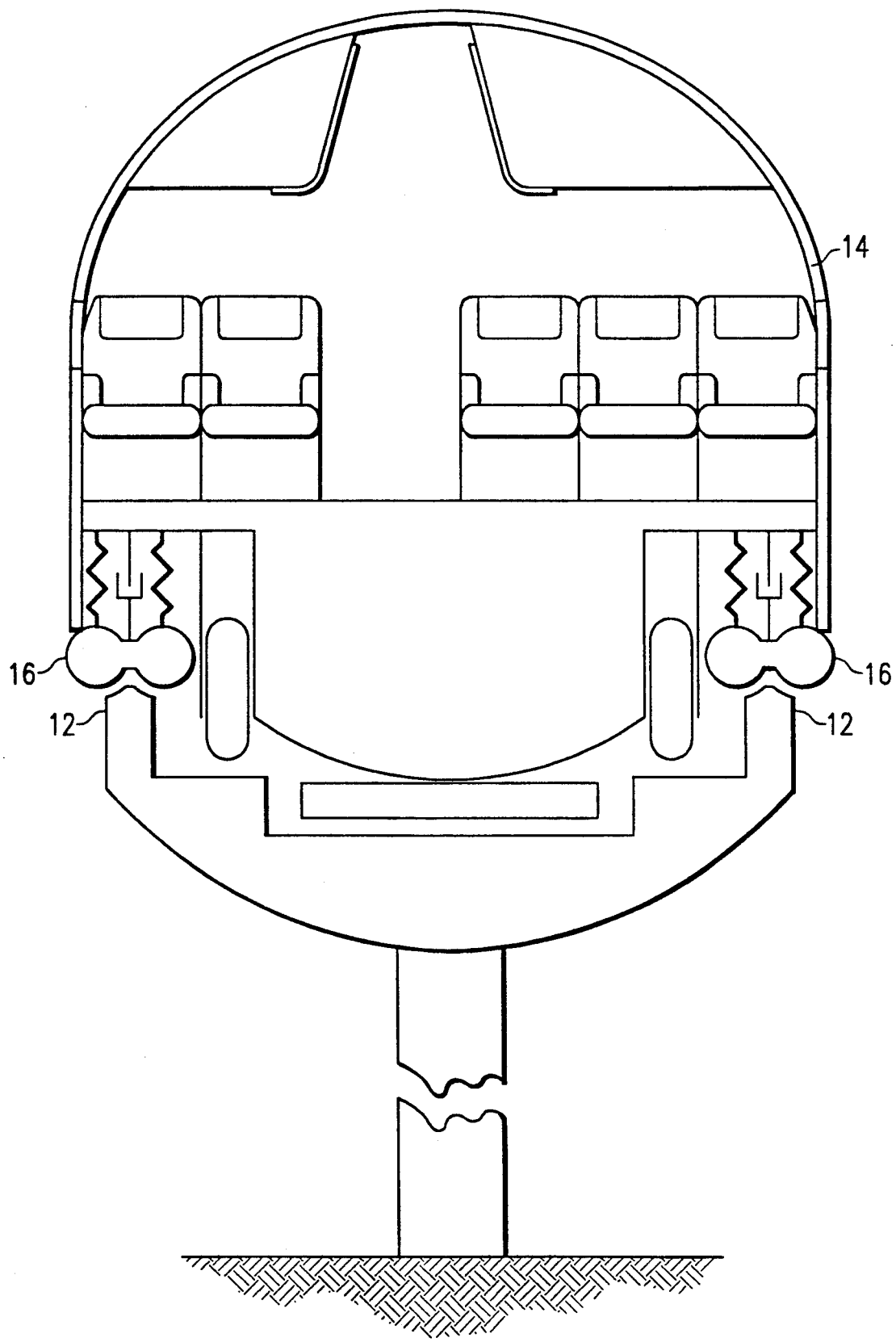
FIG. 2 is a sectional view taken along line 2—2 in FIG. 1.

Vehicle 10 illustrated in FIGS. 1a, 1b and 2 is a train which is mounted on a pair of spaced parallel rails 12. Train 10 includes a plurality of individual cars 14 which provide the seating of passengers (or cargo storage). Individual support and guidance systems 16 are provided over each rail 12 in an area which spans the adjoining ends of the cars 14. Each car may be provided with suitable support means (not shown) for the support of the car when the systems 16 are not in operation.

As shown in FIG. 2, a support system 16 is provided over each of the rails 12. The support system 16 is shown in greater detail in FIG. 3. Such support system 16 includes a housing 18 which contains a pair of superconducting conductors 20, iron shield 22 and passages 24 for the liquid helium which is to be circulated therethrough to ensure that the temperature is below the critical point for the superconductivity operation of the super conductors 20. It should be noted that rail 12 has an upper edge which is relatively flat on top forming surface 26 and including concave surfaces 28 extending from top surface 26 to each side of rail 12. Iron shield 22 has a continuous shape, the central portion 30 of which is generally parallel with top surface 26 and bulbous side portions 32 which have a lower surface 34 which are generally parallel with concave surfaces 28 and upper recesses 36 in each bulbous side portion 32 to provide for helium passages 24. Shield 38 surrounds housing 18 as shown and is surrounded by vacuum housing 40. Though not shown, it is understood that suitable connections are provided to make the necessary electrical connections to super conductors 20 and also suitable lines through which liquid helium is conducted into housing and back to the source (not shown) of the liquid helium.

Iron shield or core 22 is shaped to shunt the return flux of the magnet so that there is no fringe magnetic field produced in the passenger compartment of the cars 14. Iron core 22 will also enhance the field produced by super conductors 20.

In operation, the magnetic field produced by super conductors 20 penetrates the rail and as the train moves the time-changing field induces an image current in the rail. The Lorentz force between magnetic field and image current produces a pattern of forces including vertical and horizontal components. The vertical component of force levitates the train from the rail. The horizontal components of force are balanced when the train is centered on the rail, but deliver a restoring force if it moves to the right or left. Both lift and guidance functions are thus achieved by a single magnet with respect to each rail. No feedback loops and no stabilizing systems are required for the proper operation of the system.

Any suitable drive may be used to propel, vehicle 10 along the path defined by rails 16. Also, it should be understood that the present invention may be used with a single car.

What is claimed is:

1. A system for supporting and guiding a vehicle with respect to a first rail, comprising:
   a first superconducting magnet supported from said vehicle, having first and second surfaces for opposing first and second top conductive surfaces, respectively, of said first rail, said first magnet comprising:
   first and second conductors, disposed near said first and second surfaces of said magnet, respectively, for carrying current so as to generate a repelling magnetic force between said first surface of said first magnet and said first top conductive surface of said first rail, and between said second surface of said first magnet and said second top conductive surface of said first rail; and
   a shield positioned over said first and second conductors; and
   means for cooling said first and second conductors sufficiently to become superconducting;
   wherein said first and second surfaces of said first magnet are at an angle relative to one another such that the repelling forces between said first magnet and said first and second top conductive surfaces of said first rail result in a net levitating force and laterally guide said vehicle along said first rail.

2. A system according to claim 1 wherein said vehicle is to be supported and guided with respect to first and second parallel rails, and further comprising:
   a second superconducting magnet supported from said vehicle and having first and second surfaces for opposing first and second conductive surfaces of said second rail, respectively, said second magnet comprising:
   third and fourth conductors, disposed near said first and second surfaces of said second magnet, respectively, for carrying current so as to generate a repelling magnetic field between said first surface of said second magnet and said first conductive surface of said second rail, and between said second surface of said second magnet and said second conductive surface of said second rail;
   a second shield positioned over said third and fourth conductors; and
   means for cooling said third and fourth conductors of said second magnet sufficiently to become superconducting;
   wherein said first and second surfaces of said second magnet are at an angle relative to one another such that the repelling forces between said second magnet and said second rail result in a net levitating force.

3. The system of claim 1, wherein said shield comprises ferromagnetic material in an arcuate shape.

4. The system of claim 1, wherein said first and second surfaces of said magnet are formed in a convex shape.

5. In a vehicle rail system, an electromagnetic support and guidance system to support and guide the vehicle with respect to a rail, comprising:
   a superconducting magnet supported from said vehicle in a position near said rail;
   a passive arcuate shield, comprising ferromagnetic material, positioned over said magnet;
   a magnet housing surrounding said magnet and said shield with flow passages therein;
   means for providing chilled gas to said housing through said passages to cool the magnet to superconducting temperature;
   wherein said shield has the characteristics and shape to prevent the entry of a substantial fringe field to within the interior of said vehicle and to enhance the magnetic field produced by said magnet.

6. The support and guidance system of claim 5, wherein said providing means comprises a source of cooled helium in fluid communication with said passages of said housing.

7. The support and guidance system of claim 5, further comprising an outer vacuum housing surrounding said magnet housing.

8. A vehicle rail system, comprising:
   at least one rail having first and second top conductive surfaces disposed at an angle relative to one another, said rail supported in the desired path of the vehicle,
   a vehicle,
   at least one superconducting magnet supported on said vehicle near said rail, comprising:
   first and second conductors, disposed near and opposing said first and second top conductive surfaces of said rail, respectively, for carrying current so as to develop repelling forces between said first conductor and said first top conductive surface of said rail, and between said second conductor and said second top conductive surface of said rail, so that the net repelling forces therebetween levitate said vehicle from said rail, and so that the repelling forces therebetween laterally guide said vehicle along said rail; and
   means for shielding the fringe field of said magnet from said vehicle interior.

9. A vehicle rail system according to claim 8, wherein:
   said at least one rail comprises a pair of said rails positioned in spaced parallel relationship to each other;
   and wherein said at least one superconducting magnet comprises a pair of said superconducting magnets supported on said vehicle, one of said pair of magnets being positioned over one of said rails and the other of said magnets being positioned over the other of said rails to support and guide said vehicle on said rails;

and wherein said shielding means comprises a pair of ferromagnetic shields, each of said shields associated with one of said pair of magnets.

10. A vehicle rail system according to claim 8 wherein said shielding means comprises;

a structure comprising ferromagnetic material, disposed between said magnet and the vehicle.

11. A vehicle rail system according to claim 8 wherein;

said magnet further comprises a housing surrounding the magnet and providing passages for the circulation of a cooling medium to ensure the superconductivity of the magnet, and wherein said shielding means comprises a structure comprising ferromagnetic material, disposed within the magnet housing.

12. The system of claim 8, wherein said first and second top conductive surfaces of said rail are each concave.

13. The system of claim 12, wherein said rail has a third top surface disposed between said first and second surfaces, said third top surface being substantially flat.

14. The system of claim 12, wherein said first and second conductors each comprise:

a plurality of superconductor filaments disposed adjacent one another in such a manner as to match the concavity of the opposing top conductive surface of said rail.

* * * * *